United States Patent Office 3,248,427
Patented Apr. 26, 1966

3,248,427
PROCESS FOR PURIFYING p-AMINO-
DIPHENYLAMINE
Harold Greenfield, Watertown, Conn., assignor to United
States Rubber Company, New York, N.Y., a corporation of New Jersey
No Drawing. Filed Nov. 10, 1961, Ser. No. 151,435
2 Claims. (Cl. 260—576)

This invention relates to the purification of p-aminodiphenylamine. More particularly, the invention relates to the removal of objectionable and difficultly-removable sulfur compounds which are present in crude p-aminodiphenylamine obtained by the sodium sulfide or hydrosulfide reduction of p-nitrosodiphenylamine.

The invention provides a commercially attractive and highly effective method for refining crude p-aminodiphenylamine which is unsuitable for use in many commercial processes for the reason that it contains varying amounts of sulfur compounds which are very difficult and, in some cases, impossible to remove by ordinary methods, as by distillation. These sulfur impurities are particular present in p-aminodiphenylamine prepared by the reduction of p-nitrosodiphenylamine (in the form of its sodium or potassium salt) with sodium sulfide or sodium hydrosulfide. The impurities probably consist of a mixture of inorganic sulfur compounds, such as sulfides and elemental sulfur, although some organic sulfur, e.g., in the form of aryl mercaptans, may also be present.

It is well known in the art that noble metal catalysts, such as palladium and platinum, are poisoned by traces of sulfur-containing compounds. Indeed, it has been demonstrated that hydrogenation reactions which are catalyzed by noble metals are inhibited by quantities of sulfur-containing compounds of the order of one to ten parts per million parts of the substrate to be hydrogenated (see, for example, E. B. Naxted and co-workers, J. Chem. Soc. 1921, 225; 1934, 672; 1937, 603, 1004; 1954, 3947).

Complete separation of said sulfur compounds from p-aminodiphenylamine is extremely difficult, if not impossible, by use of the ordinary methods, as by distillation. It is important for many industrial applications, however, that p-aminodiphenylamine be substantially free from sulfur impurities, which impurities are capable of interfering with the effectiveness of catalysts in subsequent chemical reactions. An example of this is shown in the following.

Para-aminodiphenylamine is capable of undergoing catalytic reductive alkylation with hydrogen and aldehydes or ketones. For example, N-isopropyl-N'-phenyl-p-phenylenediamine may be prepared from the palladium-catalyzed reductive alkylation of p-aminodiphenylamine with hydrogen and acetone. When p-aminodiphenylamine which is contaminated with sulfur in forms capable of poisoning the palladium catalyst is used as the starting material, the effectiveness of this reaction, as well as the commercial acceptability of the product, is lessened. Thus, the extent of reaction, the rate of reaction and the quality of the product obtained depends greatly upon the amount of sulfur impurities that are present.

It has heretofore been necessary to subject sulfur-contaminated p-aminodiphenylamine to distillation for the purpose of obtaining an alkylatable p-aminodiphenylamine. Distillation, however, only partially removes the sulfur impurities, converting about 35% of the contaminated p-aminodiphenylamine into alkylatable material, though of poor and variable quality. Distillable organic cyclic sulfides are probably formed by the reaction of p-aminodiphenylamine with inorganic sulfur during distillation. Consequently, both the crude and distilled p-aminodiphenylamine can be expected to contain sulfur in forms capable of poisoning the palladium catalyst used in subsequent reductive alkylation reactions. Hitherto, no practical and economical method has been available for effecting a thorough and economical separation of such objectionable and difficulty-removable sulfur compounds.

It is, therefore, an object of this invention to provide a method of desulfurizing sulfur-contaminated p-aminodiphenylamine.

It is a further object of this invention to provide a method for the removal of sulfur impurities present in p-aminodiphenylamine obtained by the sodium sulfide or hydrosulfide reduction of p-nitrosodiphenylamine.

It is another object of this invention to provide a method of desulfurizing sulfur-contaminated p-aminodiphenylamine in order that the subsequent reductive alkylation of p-aminodiphenylamine may be carried out to substantial completion with economic use of a palladium catalyst.

It is still another object of this invention to provide a desulfurized p-aminodiphenylamine from the contaminated product obtained by the sodium sulfide or hydrosulfide reduction of p-nitrosodiphenylamine.

Other and further important objects of this invention will become apparent from the following description and appended claims.

In accordance with the present invention, crude p-aminodiphenylamine, contaminated with sulfur compounds, as when prepared by the sodium sulfide or hydrosulfide reduction of p-nitrosodiphenylamine, is subjected to a process for the substantially complete removal of the sulfur contaminants. The process comprises heating the sulfur-contaminated p-aminodiphenylamine with lead oxide (litharge), followed by distillation and recovery of sulfur-free p-aminodiphenylamine.

It is believed that the heat treatment with lead oxide converts the inorganic sulfur contaminants into lead sulfide and the aryl mercaptan impurities into lead mercaptides and aryl disulfides. In general, the heating step should be conducted at temperatures of 150° C. to 250° C. for a period of time ranging from 8 hours at the lower temperatures to as little as one-half hour at the higher temperatures. The p-aminodiphenylamine, which is in a molten state (M.P., 66–67° C.) after this heating treatment, may then be directly distilled from the lead compounds of sulfur, the aryl disulfides and any unreacted lead oxide under reduced pressure. In the alternative, the molten p-aminodiphenylamine may first be physically separated as by decantation, from the solid lead sulfide (M.P., 1120° C.) and unreacted lead oxide (M.P., 888° C.) and then subjected to distillation. A suitable distillation temperature range was found to be from about 200° C. to about 230° C. at a pressure of about 8–21 mm. Hg. Any aryl disulfide which may be present will not distill under these conditions. Temperatures above 260° C. should be avoided, since aryl disulfides generally decompose at temperatures over 270° C.

I have found that from about 2 to about 10 parts by weight of lead oxide per 100 parts of sulfur-contaminated p-aminodiphenylamine are suitable for the purposes of this invention.

The following examples will serve to illustrate preferred embodiments of this invention, parts being given by weight unless otherwise specified:

*Example 1*

To a solution of 940 parts of the sodium salt of p-nitrosodiphenylamine and 130 parts of sodium hydroxide in 5230 parts of water was added 440 parts of sodium hydrosulfide at room temperature. The temperature of the reaction rose to about 45° C. The reaction mixture was heated to 90° C. and held at this temperature for one-half hour. After cooling, filtration, and distillation under reduced pressure, there was obtained 710 parts of p-aminodiphenylamine. An analysis of the p-aminodiphenylamine before distillation revealed a sulfur content of 0.02–0.13 part per hundred.

The foregoing example illustrates a typical preparation of p-aminodiphenylamine by the sodium hydrosulfide reduction of p-nitrosodiphenylamine. The substitution of sodium sulfide for the sodium hydrosulfide yields similar results.

Example II

Forty-five parts of distilled p-aminodiphenylamine, obtained from Example I, were treated with 41 parts of acetone, 0.90 part of a 5% palladium-on-carbon catalyst, and hydrogen at 140° C. and 150 p.s.i.g. for one hour in a 250 ml. Magne Dash autoclave. There was very little gas absorption, showing that the desired reductive alkylation was occurring only slightly. Even more complete poisioning of the catalyst, indicated by still less gas absorption, was observed when a sample of p-aminodiphenylamine prepared as shown by Example I except that the product was not distilled, was used.

Example III

One-hundred and six parts of the distilled p-aminodiphenylamine obtained from Example I were heated with stirring in a 250-ml. flask with 10.6 parts of litharge at 215–225° C. for one hour. The molten liquid was decanted into a distillation flask and p-aminodiphenylamine distilled at 223–228° C. at 21 mm. pressure and a pot temperature of 231–240° C. Forty-five parts of this litharge-treated product that was collected to wit, sulfur-free p-aminodiphenylamine, were then reductively alkylated with 41 parts acetone, 0.90 part of a 5% palladium-on-carbon catalyst, and hydrogen at 140° C. and 150 p.s.i.g. for 4 hours in a 250-ml. Magne Dash autoclave. After removal of the catalyst by filtration and of the solvent by distillation, a residue product was obtained that analyzed about 90% p-N-isopropylaminodiphenylamine by I.R. analysis.

Example IV

A sample of 100 parts of the distilled p-aminodiphenylamine obtained from Example I was heated with stirring in a 250-ml. flask with 10 parts of litharge for 4 hours at 148–152° C. The molten liquid was decanted into a distillation flask and p-aminodiphenylamine distilled at 223–227° C. at 19 mm. pressure at a pot temperature of 231–241° C. This litharge-tereated product was satisfactorily reductively alkylated as described in Example III.

Example V

A sample of 100 parts of the distilled p-aminodiphenylamine obtained from Example I was heated with stirring in a 250-ml. flask with 10 parts of litharge for 4 hours at 148–152° C. The molten p-aminodiphenylamine was filtered through filter paper. An attempted reductive alkylation of this material under conditions described in Examples II and III was unsuccessful. A comparison of this experiment with Example IV shows the necessity of distillation after the litharge treatment.

Example VI

A sample of p-aminodiphenylamine prepared by the sodium hydrosulfide reduction of the sodium salt of p-nitrosodiphenylamine and containing about 26% water, was distilled at 205–220° C. at about 13 mm. pressure and a pot temperature of 220–260° C. An attempted reductive alkylation of 45 parts of this distilled p-aminodiphenylamine with 41 parts of acetone, 0.45 part of a 5% palladium-on-carbon catalyst, and hydrogen at 150 p.s.i.g. and 140° C. in a 250 ml. Magne Dash autoclave was unsuccessful. Only about ⅓ of the usual gas absorption took place, indicating that the catalyst had been substantially poisoned.

Example VII

In a 500-ml. flask were placed 200 parts of a sample of the wet, non-distilled p-aminodiphenylamine used in Example VI, and 20 parts of litharge. The water was removed by distillation at atmospheric pressure. The residue was heated with stirring at 175–185° C. for 30 min., heated to 225° C. in 15 min. and then cooled. Without prior separation from the litharge, the p-aminodiphenylamine was distilled at 228–230° C. at 20 mm. pressure and a pot temperature of 232–234° C. This material was successfully reductively alkylated to p-N-isopropylaminodiphenylamine in 4 hours under the conditions described in Example VI. A residue product was obtained that was about 90% p-N-isopropylaminodiphenylamine by I.R. analysis.

Example VIII

In ae 500-ml. flask were placed 250 parts of a sample of the wet, non-distilled p-aminodiphenylamine used in Examples VI and VII, and 9 parts of litharge. The water was removed by distillation at atmospheric pressure. The residue was heated with stirring at 250–255° C. for 30 minutes and then cooled. Without prior separation from the litharge, the p-aminodiphenylamine was distilled at 203–205° C. at 8 mm. pressure and a pot temperature of 210–250° C. This material was successfully reductively alkylated as described in Example VII.

Example IX

In a 1000-gallon carbon-steel vessel were placed 5000 lbs. of sulfur-poisoned, non-distilled p-aminodiphenylamine, prepared by the sodium hydrosulfide reduction of the sodium salt of p-nitrosodiphenylamine and containing about 30% water, and 300 lbs. of litharge. The water was removed at atmospheric pressure and 150° C., and the residue then agitated for 8 hours at 150° C. The molten p-aminodiphenylamine was decanted and transferred to a 750-gallon carbon-steel distillation pot. Approximately 3000 lbs. of sulfur-free p-aminodiphenylamine was distilled over at 210° C. and 10 mm. pressure. This product was found to be very satisfactory in subsequent palladium-catalyzed reductive alkylation reactions.

Example X p-Amino diphenylamine, satisfactory for palladium-catalyzed reductive alkylations, was also produced from sulfur-poisoned p-aminodiphenylamine by direct distillation from 6% litharge, based on 100 parts of p-aminodiphenylamine, at a pot temperature of 230° C. at 15 mm. pressure. This method is not preferred however, because of the difficulties involved in removing the spent litharge from the distillation pot.

Having thus described my invention, what I claim and desire to protect by Letters Patent is:

1. A process for the purification of p-aminodiphenylamine contaminated with a sulfur-containing compound comprising heating 100 parts of said contaminated p-aminodiphenylamine with from about 2 to about 10 parts by weight of lead oxide at 150–250° C. for at least one-half hour, then distilling off p-aminodiphenylamine.

2. The process of claim 1 wherein said contaminated p-aminodiphenylamine is the product of the reduction of p-nitrosodiphenylamine with a compound selected from the group consisting of sodium sulfide and sodium hydrosulfide.

References Cited by the Examiner

UNITED STATES PATENTS

| | | | |
|---|---|---|---|
| 1,772,985 | 8/1930 | Culmer et al. | 208—287 |
| 1,789,168 | 1/1931 | Cannon et al. | 208—197 |

(Other references on following page)

| UNITED STATES PATENTS | | | |
|---|---|---|---|
| 1,900,426 | 3/1933 | Busdorff et al. | 260—576 |
| 2,768,931 | 10/1956 | Ambler | 208—197 |
| 3,050,460 | 8/1962 | Brooks | 208—197 |

FOREIGN PATENTS

| 1,075,402 | 4/1954 | France. |
|---|---|---|
| 65,103 | 9/1955 | France. |
| (Addn. to 1,075,402) | | |

OTHER REFERENCES

Lauer et al., J.A.C.S., 58, pages 225–8 (1956).

CHARLES B. PARKER, *Primary Examiner.*

LEON ZITVER, *Examiner.*

MICHAEL S. JAROSZ, ROBERT V. HINES,
*Assistant Examiners.*